United States Patent
Reihl et al.

[11] Patent Number: 6,158,803
[45] Date of Patent: Dec. 12, 2000

[54] VEHICLE ROOF WITH AT LEAST ONE COVER

[75] Inventors: Peter Reihl, Starnberg; Bernhard Wingen, Feldkirchen; Walter Schätzler, Starnberg, all of Germany; Francois De Gaillard, Mouilleron-en-Pareds, France; Erwin Kohout, Gräfelfing; Wolfgang Liebhart, München, both of Germany

[73] Assignee: Webasto Karosseriesysteme GmbH, Stockdorf, Germany

[21] Appl. No.: 09/077,298

[22] PCT Filed: Oct. 1, 1997

[86] PCT No.: PCT/EP97/05395

§ 371 Date: Sep. 18, 1998

§ 102(e) Date: Sep. 18, 1998

[87] PCT Pub. No.: WO98/14342

PCT Pub. Date: Apr. 9, 1998

[30] Foreign Application Priority Data

Oct. 1, 1996 [FR] France ................... 96 11950
Mar. 29, 1997 [DE] Germany .............. 197 13 347

[51] Int. Cl.[7] .................................................. B60J 7/043
[52] U.S. Cl. ................ 296/216.04; 296/223; 296/216.01
[58] Field of Search ........................... 296/216.01, 221, 296/222, 216.04, 223

[56] References Cited

U.S. PATENT DOCUMENTS

| 4,463,983 | 8/1984 | Hellriegel | 296/213 |
| 5,090,767 | 2/1992 | Schreiter et al. | 296/216 |
| 5,092,651 | 3/1992 | Baldwin et al. | 296/223 |
| 5,335,961 | 8/1994 | Reinsch et al. | 296/213 |
| 5,405,185 | 4/1995 | Cheron et al. | 296/223 |
| 5,791,728 | 8/1998 | Hausrath | 296/216 |

*Primary Examiner*—D. Glenn Dayoan
*Assistant Examiner*—Patricia Engle
*Attorney, Agent, or Firm*—Nixon Peabody LLP; David S. Safran

[57] ABSTRACT

A vehicle sun roof with a cover (3) intended to cover a roof opening (5) when in the closed position and to be both pushed upwards at its rear edge so as to be at least in the aeration position, and elevated relative to its closed position so as to be at least in the open position. Furthermore, the vehicle roof has a cover elevating and displacing device (3) along at least one guide integrated to the roof, which has also a bearing device extending from the rear edge area of the cover. In order for the roof to have a more stable bearing when in the open position and to keep, at the same time, the same smooth appearance as in the closed position, a bearing device (43) is provided which has an inactive position at or below the cover level (3).

15 Claims, 10 Drawing Sheets

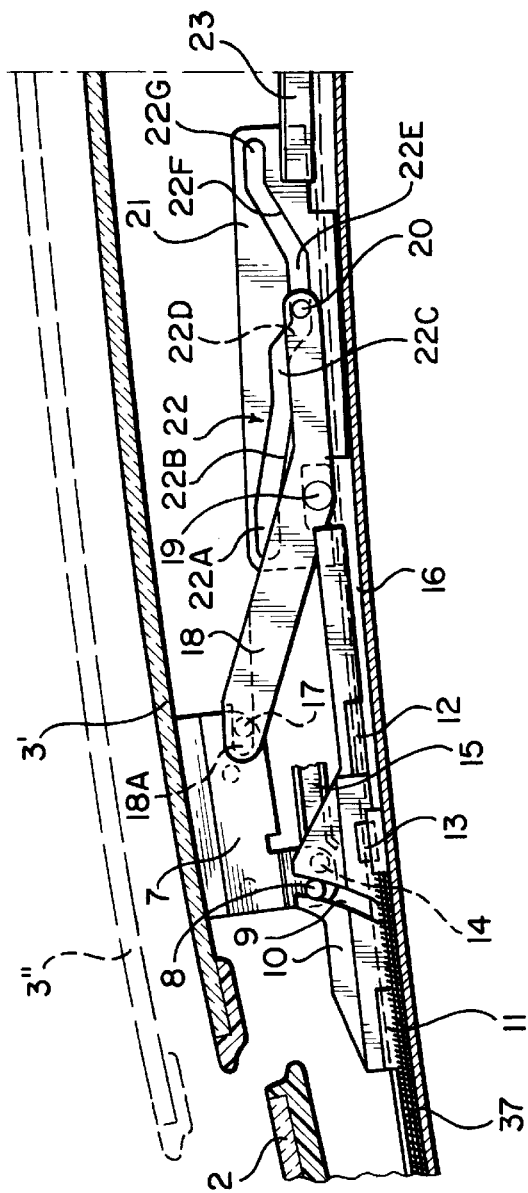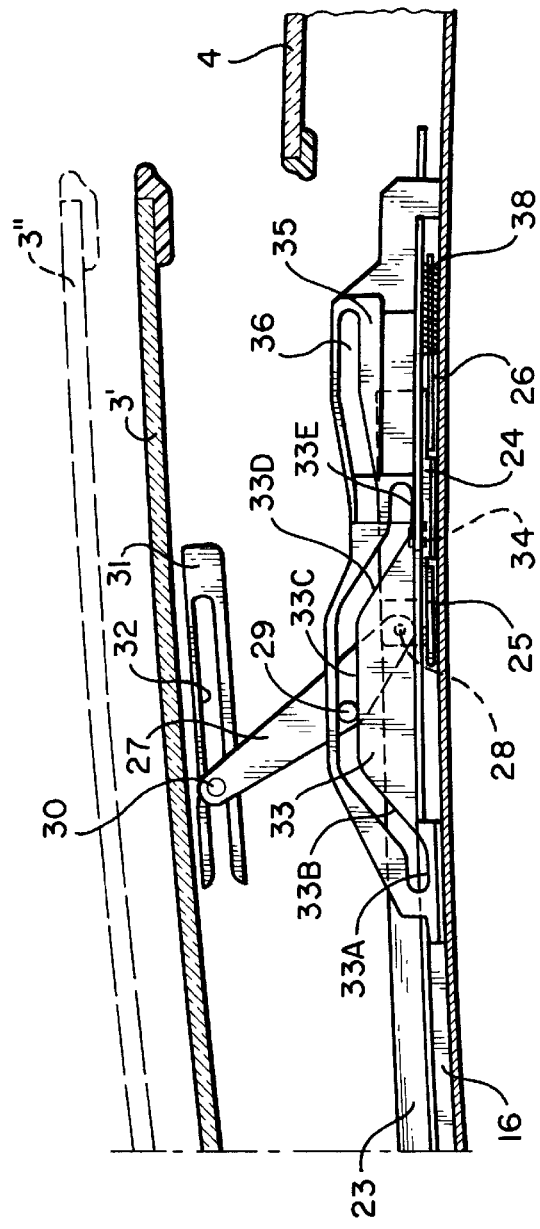

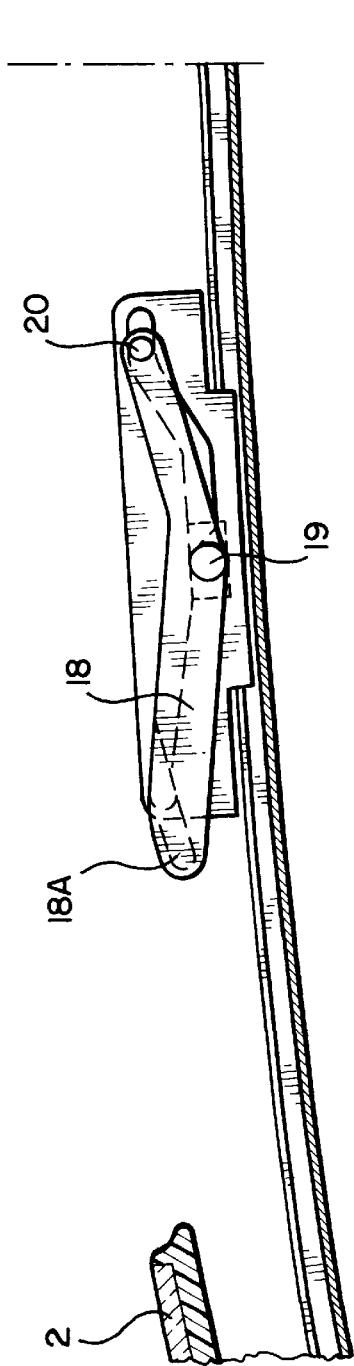
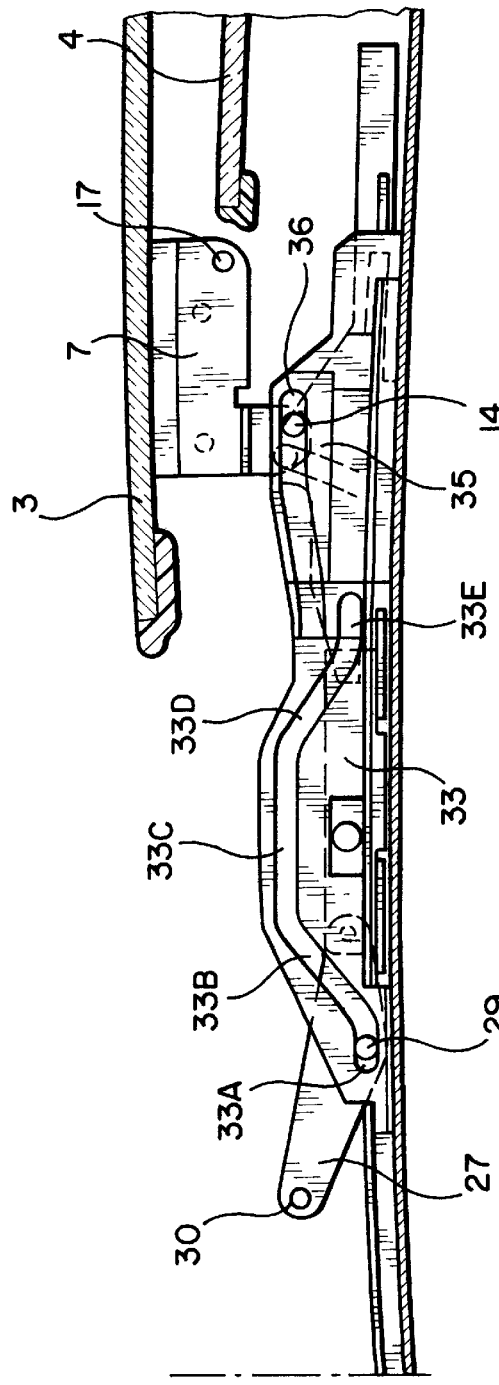

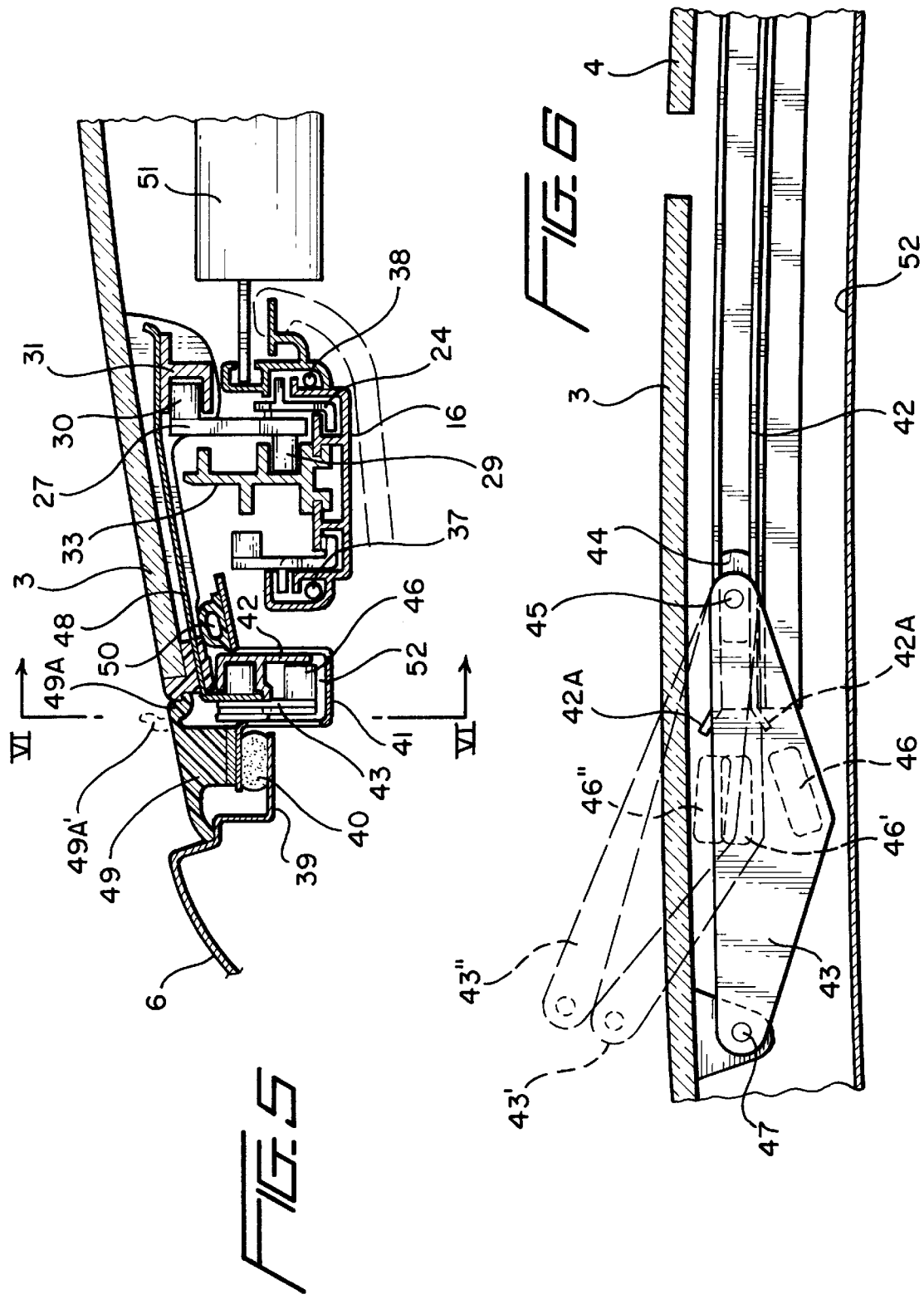

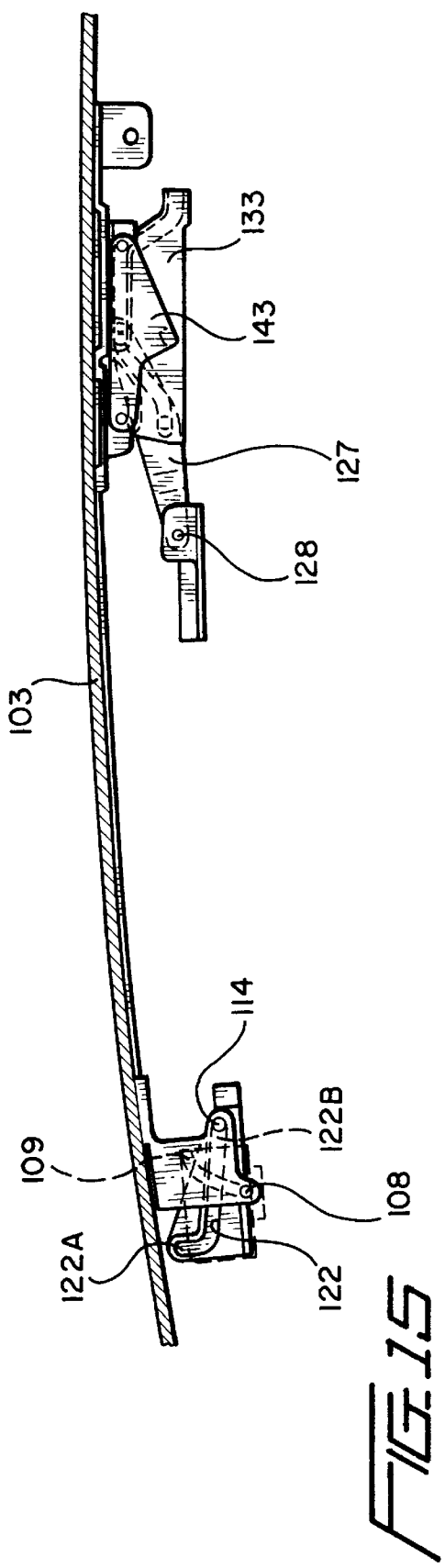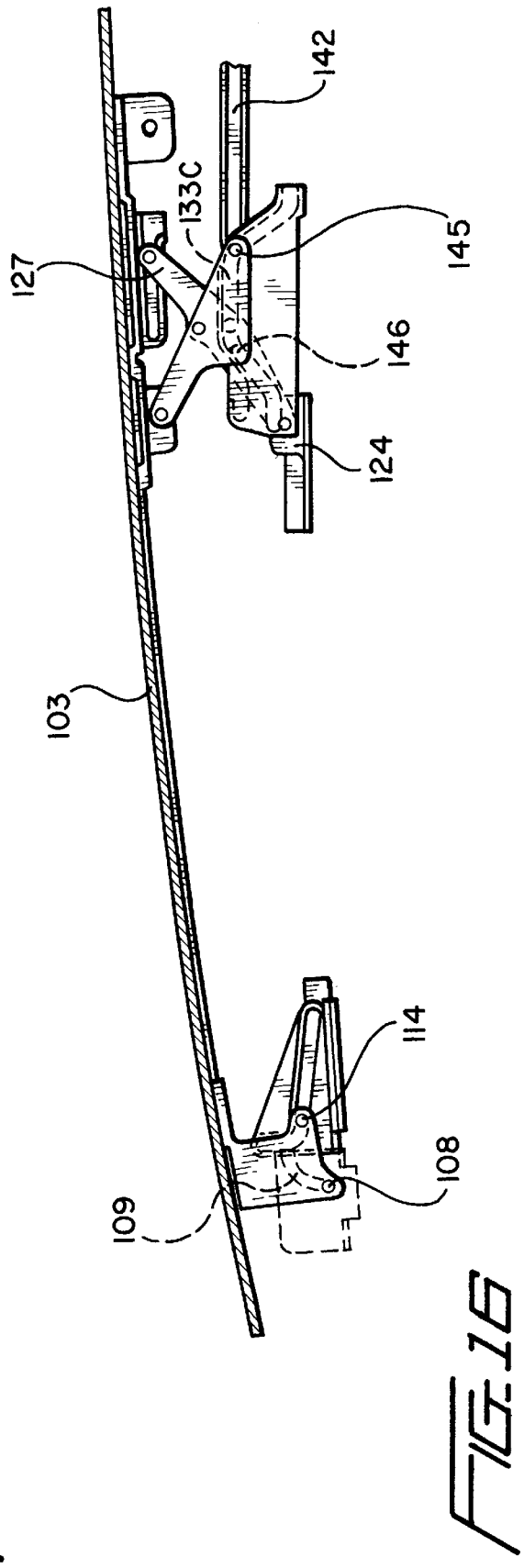

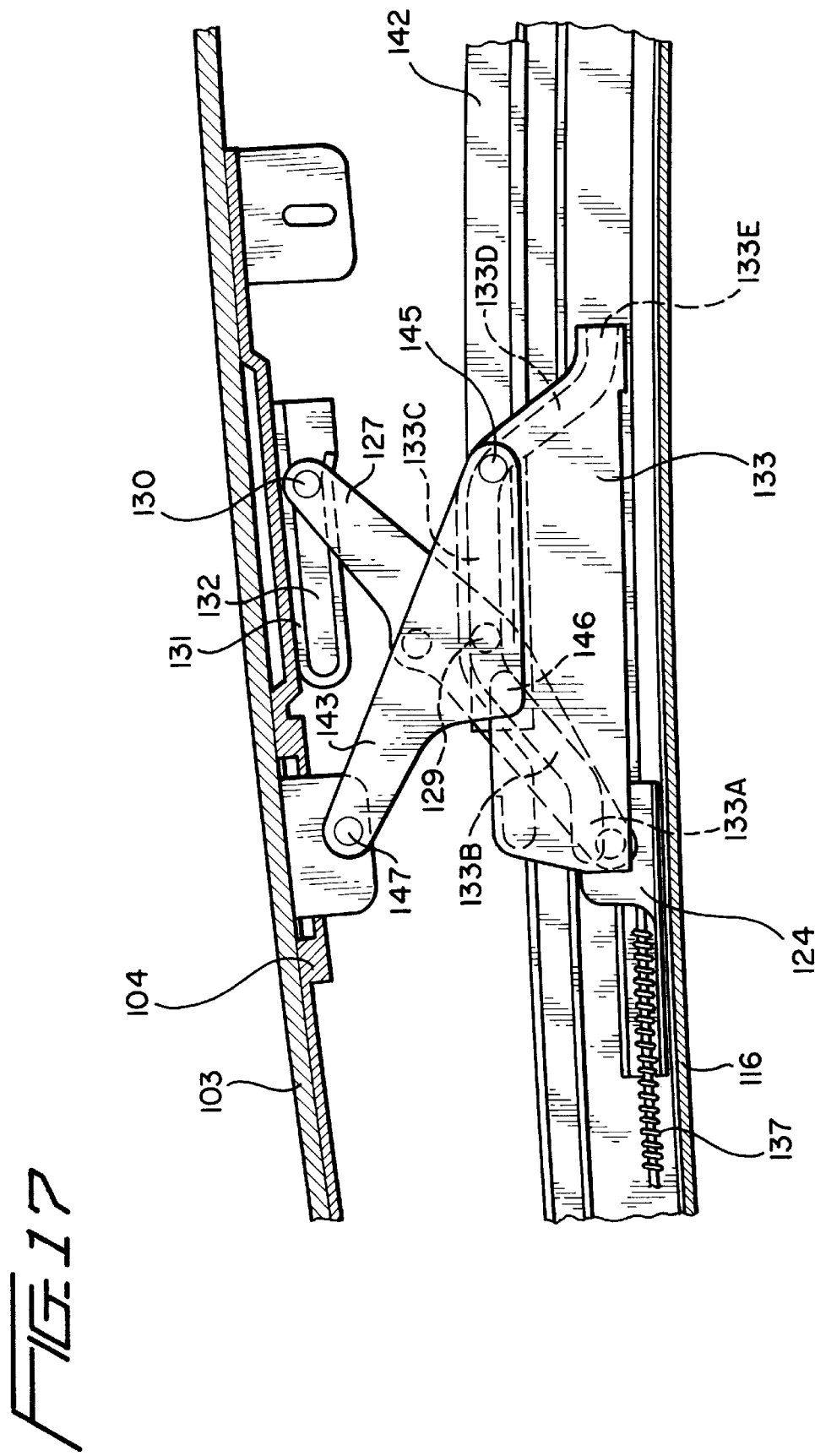

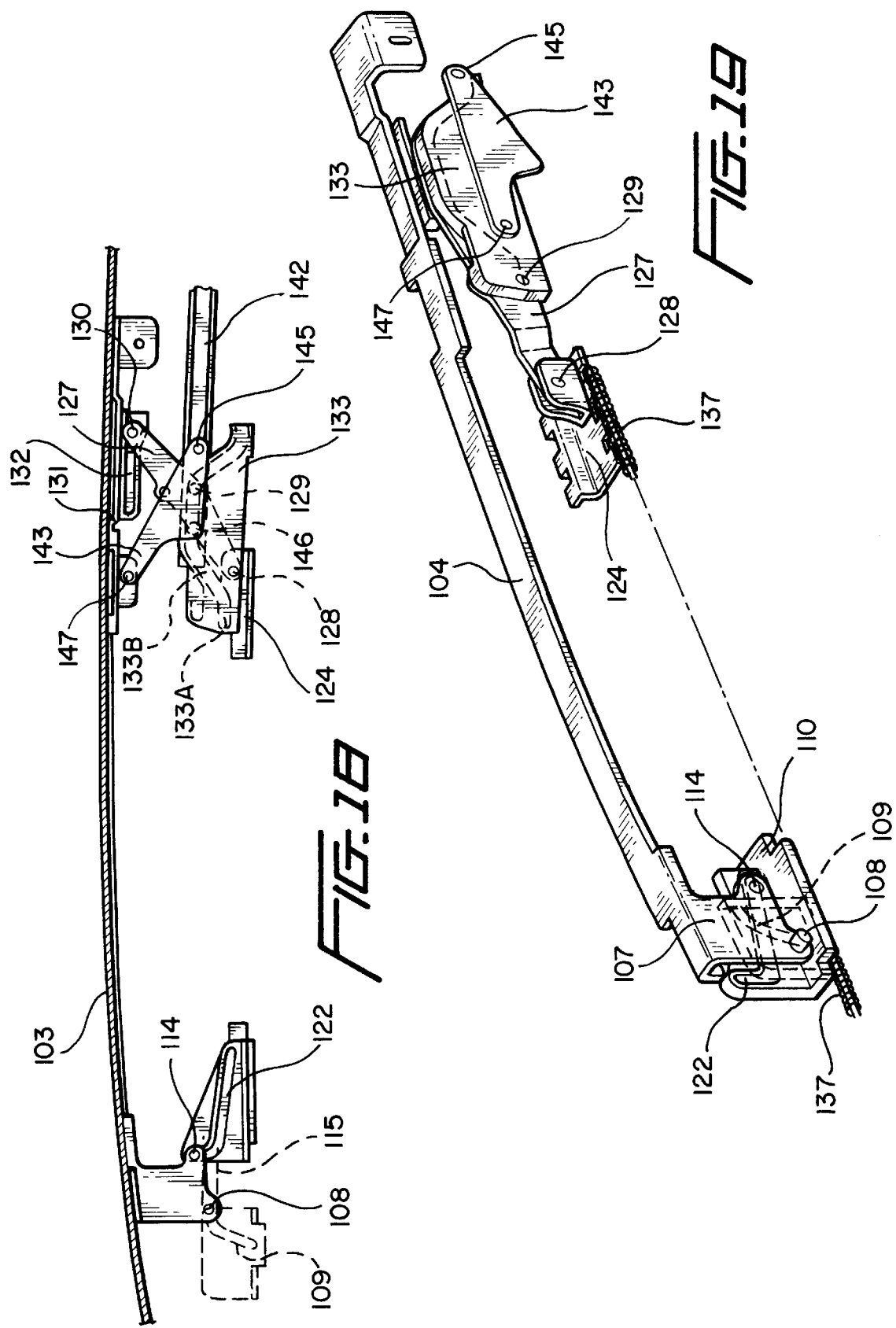

VEHICLE ROOF WITH AT LEAST ONE COVER

BACKGROUND OF THE INVENTION

1. Field of the Invention

The invention relates to a motor vehicle roof with at least one cover [as claimed in the preamble of claim 1] for covering of roof opening in a closed position and which can be raised at its rear edge into at least one ventilation position, and which can be moved from the closed position into at least one open position. In particular, the invention relates to such a vehicle roof having device for lifting of cover, a device for moving the cover along at least one guide and a support device which engages in the area of the rear edge of the cover.

2. Description of Related Art

A motor vehicle roof of this type is known from German Patent DE-C1 42 38 946. In this roof, the cover is raised by means of a lifting mechanism, and in doing so, a pilot pin mounted on the roof is transferred to a railing-like roof guide located above the fixed roof. In this roof, with the cover closed, the guide mounted on the roof projects above the fixed roof skin so that, overall, there is not a smooth appearance. Furthermore, with the cover opened, the lifting levers which emerge forward from the cranks in the direction of travel remain in the raised state; this is also disadvantageous for the optical appearance of this vehicle roof. There is, furthermore, the danger that the lifting lever changes in its raised position due to shaking movements so that, when the cover is closed, the cover which moves forward under certain circumstances can miss the corresponding pin on the lifting lever with the cover crank opened forward.

SUMMARY OF THE INVENTION

The object of this invention is to devise a vehicle roof which offers a pleasing optical appearance in all cover positions and in which secure support of the cover in all phases of motion is ensured.

This object is achieved as in accordance with the invention by the support device which engages in the area of the rear edge of the cover when it moves out of the roof opening having a position that is at the level or under the level of cover in the closed position of cover.

The principal idea of this invention is to additionally support the cover in the rear area when moving out of the roof opening, the support means with the cover closed lying underneath or at least flush with the roof contour.

Because the guide element is formed preferably by a support lever, which is coupled at one end in the rear area of the cover and with its other end is supported with at least one sliding element in a guide mounted on the cover, the cover is held securely on the front edge and rear edge when the roof opening has been almost completely cleared. In contrast to known lifting and sliding roofs, in which the cover is supported only in the front third, in this way, very great stability is achieved, even at high speeds.

According to one advantageous embodiment, the support device functions actively only when the cover is moved.

For optical reasons, it is advantageous if the support device in the closed position of the cover in the vertical projection is located underneath it.

By supporting the rear edge of the cover by means of a guide element independent of the lifting lever in the form of a support lever which lies flat when the cover is closed in the area of a guide rail mounted on the cover, it is possible to have the guide mounted on the cover for this support lever to run at a level below the fixed vehicle roof, so that any guides located on the fixed vehicle skin are dispensable. The closed vehicle roof thus forms a completely smooth appearance ("flush glazing").

Especially reliable support of the cover arises when the support lever has two sliding elements, of which the first, located in the back, is permanently engaged with the guide mounted on the cover, and defines a swivelling axis for the support lever in the lifting motion of the cover, and of which the second sliding element engages the guide only during the displacement motion of the cover. Easy transfer from the raising phase into the displacement phase is ensured by permanent engagement of the first sliding element.

As already mentioned, it is especially advantageous if the guide mounted on the cover for the support lever is located entirely under the level of the fixed vehicle roof. Here, the guide mounted on the cover of the support lever is preferably located in the area of the side edge of the cover in a recessed part of the fixed vehicle roof in which there can be a separate support frame for the guide mounted on the cover on a sunken flange, or in which the recessed part is made in the form of a recessed bead directly on the vehicle roof.

To further improve the optical appearance and to protect the cover-mounted guide of the support lever from dirt, it is advantageous if the guide mounted on the cover is covered by a flexible sealing element which covers the recessed part of the fixed vehicle roof in the rear area and which is at least partially displaced when the cover is raised and moved by the support lever which emerges to the top.

In one especially advantageous embodiment of the invention, it is provided that the opening lever can be actuated by a lifting mechanism which lies to the inside with respect to the support lever. It is furthermore advantageous if the area of the fixed vehicle roof in which the guide of the support lever is located acts, at the same time, as a gutter which runs lengthwise and which is sealed relative to the area of the lifting lever via a sealing surface. Thus, the more sensitive mechanism which is actively necessary for lifting and moving the cover is effectively protected against the effects of weather, while the support lever, which is actively involved only during displacement and otherwise passively involved in the support of the cover, can be easily located in the water-guiding area with a sliding element.

In one especially simple embodiment, there is a support device, preferably in the manner of a toggle lever arrangement, which fits behind the rear edge of the cover, either in pairs to either side or individually in a central arrangement. This support device can be raised in the simplest form manually like a lifting roof mechanism, the cover being supported easily thereon in addition when moving backwards or engaging a sliding element on the support device by means of a guide located on its bottom side.

In the following, embodiments of the invention are described using the drawings.

BRIEF DESCRIPTION OF THE DRAWINGS

FIGS. 3A and 3B show a longitudinal section through the side edge of the vehicle roof in the area of the lifting mechanism, that part of FIG. 3B being located directly behind part of FIG. 3A, with the cover raised, FIGS. 4A and 4B show a longitudinal section analogous to FIGS. 3A and 3B with the cover completely opened, FIG. 5 shows a cross section through the lifting the support mechanism at one side of the vehicle roof with the cover closed, FIG. 6 shows a partial longitudinal section in the area of the support mechanism of the cover taken along line VI—VI in FIG. 5.

FIG. 15 is a longitudinal section through another version of a vehicle roof in the closed position, FIG. 16 shows a longitudinal section as in FIG. 15 in the raised position of the rear edge of the cover, FIG. 17 shows an enlarged detailed view of the rear area of the mechanism as shown in FIG. 16, FIG. 18 shows a longitudinal section as in FIG. 15 in the transfer position from the lifting mechanism to the support mechanism, and FIG. 19 shows a schematic perspective of the mechanism as shown in FIG. 15.

DETAILED DESCRIPTION OF THE INVENTION

Figure 1:
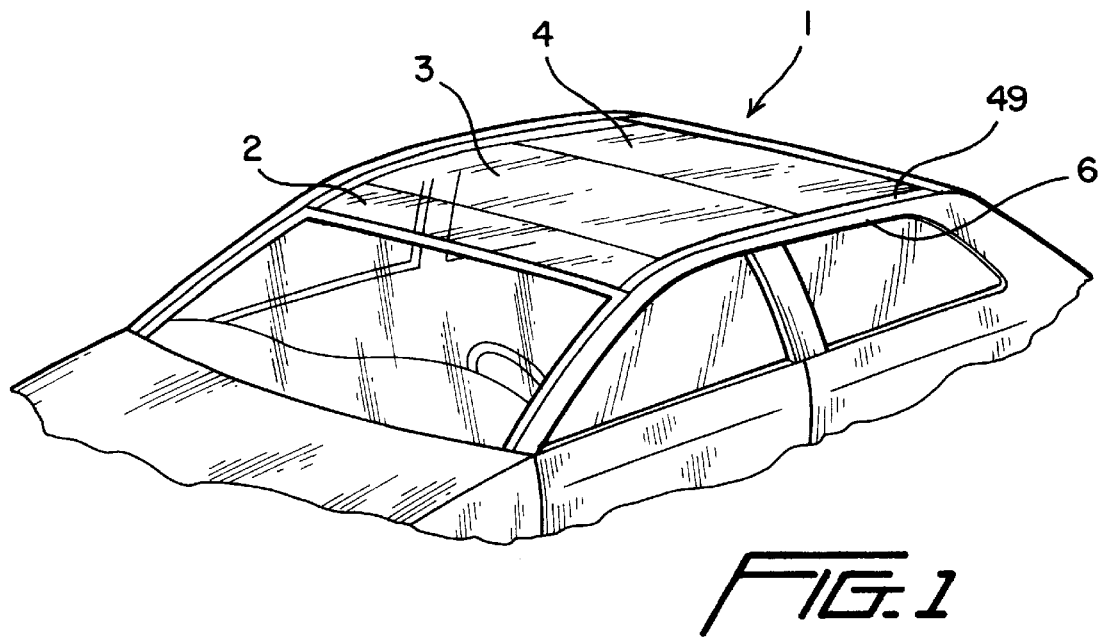
FIG. 1 shows a perspective schematic of a vehicle roof with cover closed.
Figure 2:
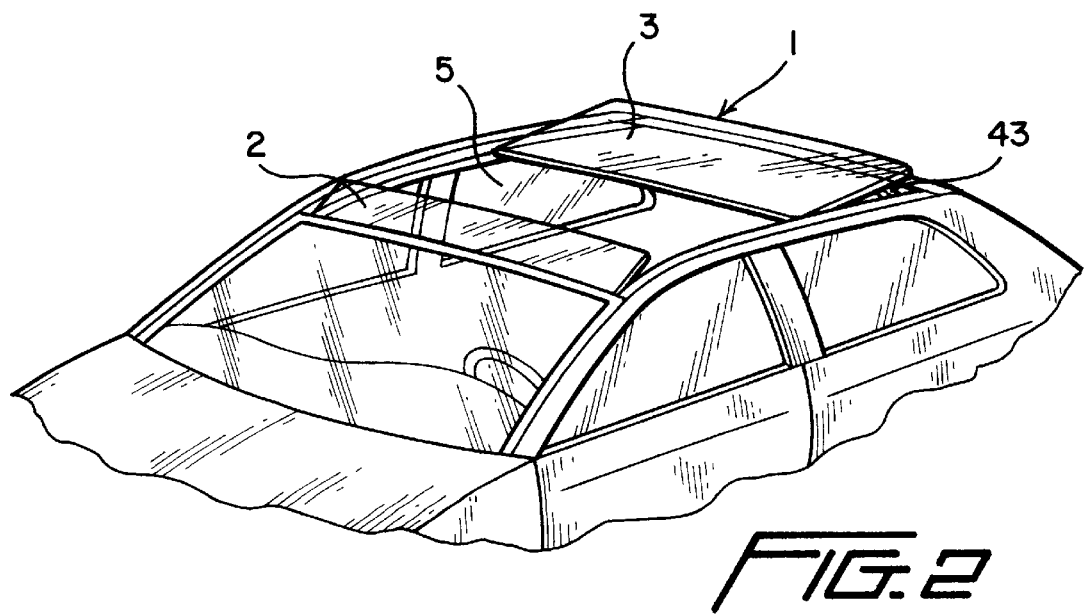
FIG. 2 shows a view as shown in FIG. 1 with the cover completely opened.
Figure 7:
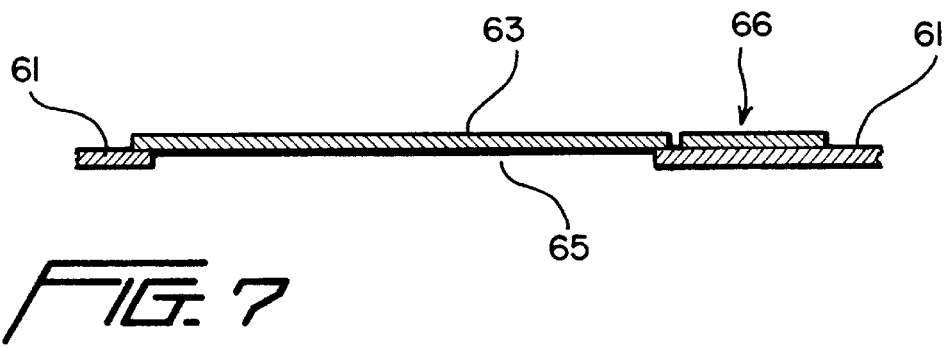
FIG. 7 shows a schematic longitudinal section through one simple version of a vehicle roof.
Figure 8:
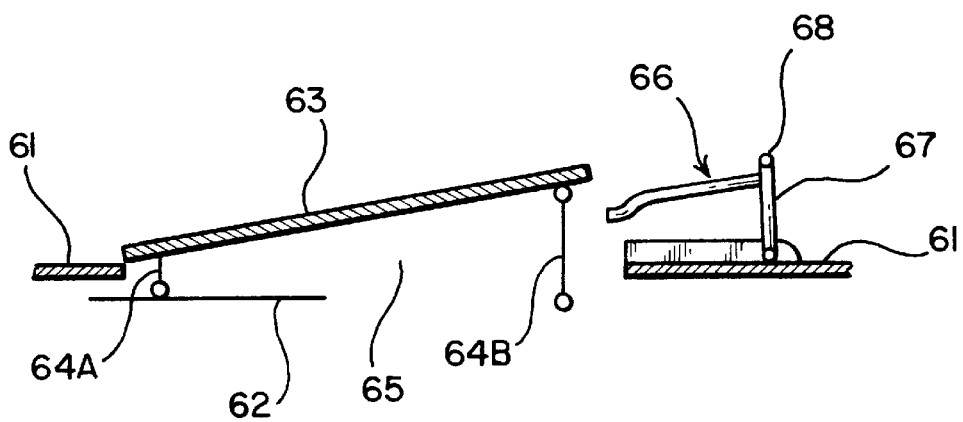
FIG. 8 shows the version as shown in FIG. 7 in the raised form.

Vehicle roof 1 is composed of a swivelling wind deflection fin 2 located above the windshield, a movable cover 3 which is behind the fin, and a fixed roof panel 4 adjacent to it. Laterally, wind deflection fin 2, cover 3 and roof panel 4 are bounded by side members 6.

In the closed state as shown in FIG. 1, vehicle roof 1 offers a completely smooth appearance. Although, cover 3 can be moved to clear roof opening 5 to the rear over the fixed vehicle roof 1, in accordance with the invention, no guides at all located above the fixed vehicle roof are necessary for this purpose. In the raised state moved to the rear, cover 3 is supported by means of support levers 43 which are coupled laterally in the area of the rear edge of the cover and which can be moved in the guides located under the level of the fixed roof skin, and upon emergence partially upwardly displace a flexible sealing element 49 which is located between side members 6 and roof parts 2, 3, 4.

The mechanism required for raising and displacing cover 3 is described in conjunction with FIGS. 3A to 4B. Subsequently, the support mechanism located laterally outside of the lifting mechanism is explained in conjunction with FIGS. 5 and 6.

Near the front edge of the cover, on cover 3, to either side there is a downwardly angled cover bearing 7. On cover bearing 7, there is pin 8 which is supported in a cam slot 9 of a control carriage 10 which is supported to move in a guide rail 16 and which defines the swivel axis of cover 3 in the raising or lowering motion of cover 3.

Control carriage 10 is guided to move in guide rails 16 by means of two sliding plates 11 and 12. During the raising or lowering motion and in the closed position of cover 3, control carriage 10 is kept engaged to guide rail 16 by a locking block 13 which can be moved transversely to the direction of displacement of cover 3. The function of this locking block 13 is fundamentally known to one skilled in the art, for example, from published German Patent Application No. DE-A1 39 30 756 or German Patent No. DE-C1 40 01 759 and is therefore not described in detail.

On cover bearing 7, furthermore, near swivel pin 8, there is guide pin 14 which, after raising the cover in the area of the front edge, is inserted into guide path 15 of guide rail 16 and is used to guide cover 3 during displacement.

On the back end of cover bearing 7, is a lifting pin 17 which interacts with a slot 18A of lifting lever 18, said crank being open to the rear. Lifting lever 18 is made as a two-sided lever, is slightly angled and is supported to swivel in its middle area in a rotary bearing 19 located stationary on guide rail 16. The leg of lifting lever 18 pointing forward has the aforementioned slot 18A that is open to the rear. On the other leg of lifting lever 18, which points to the rear, there is guide pin 20 which engages a guide path 22 in a lifting cam member 21 which is supported to move in guide rail 16. Lifting cam member 21 is used to move lifting lever 18. Guide path 22 has several guide segments 22A to 22G for this purpose.

Lifting cam member 21 is joined by means of rod-shaped connection 23 to a sliding carriage 24 which is located behind it and is guided via a sliding plate 25 which lies forward and a sliding plate 26 which lies behind to move in guide rail 16.

While forward control carriage 10 can be selectively locked via locking block 13 with guide rail 16 or can be coupled for displacement to first drive cable 37 which moves to the rear during the opening motion of cover 3, rear sliding carriage 24 can be selectively locked via locking block 34 with guide rail 16 or can be coupled to a second drive cable 38 which moves forward during the opening motion of cover 3. This opposing motion of two drive cables 37, 38, proceeding from a common drive element is known to one skilled in the art, for example, from the initially mentioned German Patent DE-C1 42 38 946 (there especially FIG. 4) and is therefore not explained in this application. In the area of the front end of sliding carriage 24, the sliding carriage 24 is coupled by means of swivel pin 28 to a lifting lever 27 which engages, via a guide pin 29 located in its middle area, a lifting cam member 33 located stationary on guide rail 16, and which engages guide path 32 of cover guide 31 by a lifting pin 30 located on its end which is opposite swivel pin 38. Cover guide 31 is located securely on the bottom of cover 3. Guide path 32 is open in a forward direction so that lifting pin 30 can emerge from it during the displacement motion of cover 3 to the rear.

Lifting cam member 33 controls the motion of lifting lever 27 when the sliding carriage 24 moves and its guide path, for this reason, has several sections 33A to 33E.

In the area of the rear edge of roof opening 5, on guide rail 16 terriers, furthermore, a stationary guide 35 which has a guide path 36 which is used to hold and limit guide pin 14 when cover 3 is completely displaced (see FIG. 4B). Shortly before completely opening, lifting of the front edge of the cover takes place by the ramp upstream of the end section of guide path 36 so that opened cover 3 lies roughly parallel to the rear roof skin (here over roof panel 4).

As is apparent from the cross section shown in FIG. 5, the complete lifting mechanism with lifting lever 27 and lifting cam member 33, in the edge area of cover 3, is located completely underneath it. For movement to the rear, cover 3 is additionally provided with a support mechanism which is located in the outermost edge area of cover 3, therefore viewed from the vehicle middle, outside of the lifting mechanism. Both the lifting mechanism with lifting lever 27 and also the support mechanism with support lever 43 are located completely underneath the level of fixed vehicle skin 1 when cover 3 is closed.

Proceeding from side member 6, a sunken flange 39 is formed to which, by means of adhesive bead 40, a support frame 41 that is upwardly open in a U-shape is attached. The U-shaped trough of support frame 41 is used, on the one hand, to attach guide 42 for support lever 43, and on the other, with its underlying bottom surface, at the same time, is a gutter 52 which runs lengthwise. Here guide 42 is attached to the inner side wall of support frame 41 at a distance from its bottom surface, so that guide 42 is likewise located above and thus outside of the actual water-guiding area.

The area between side member 6 and the edge of cover 3 is covered by means of flexible sealing element 49 which runs, preferably, over the entire length of the vehicle roof 1. This sealing element 49, on its edge facing the side edge of cover 3, has an especially flexible sealing lip 49A by which support lever 43 upwardly emerges when the cover 3 is raised or when it is moved to the rear and displaces it into the location 49A' shown in phantom outline.

On the roughly horizontal flange of support frame 41 which points to the inside, there is a lengthwise running seal 50 which separates the outside water-guiding area of gutter 52 and the support mechanism located above it with support lever 43 from the inside lifting mechanism with lifting lever 27.

Since vehicle roof 1 with its transparent cover 3 and fixed roof panel 4, with intensive incoming solar radiation, would not offer enough protection against heating of the passenger compartment, on guide rail 16 there is at least one shade 51 which, in the extended state, covers cover 3 and/or roof panel 4 from underneath. Two shades 51 can also be located directly in succession underneath the separating point between cover 3 and roof pane 4, of which one is used to shadow cover 3 and the other is used to shadow roof panel 4.

As can be seen from FIG. 6, support lever 43, on its end pointed forward, has a coupling pin 47 by which it is coupled to swivel on a part of cover inner sheet 48 which is angled downward. On its back end, the support lever 43 has a rear sliding element 44 which is permanently engaged with a rail-like guide 42 and which forms swivel axis 45 for support lever 43. Roughly in the middle area, to support lever 43 is attached a front sliding element 46 which, when support lever 43 is raised, is lifted at the same time with a lifting motion of cover 3, and in doing so, reaches the position labeled 46', in which it is located at the same height with guide 42, and via feed bevels 42A located thereon, when cover 3 moves to the rear, in addition to rear sliding element 44, enters guide 42 and thus stably supports support lever 43 in its position 43'. The position of the support lever labeled 43", in which front sliding element 46 assumes the position labeled 46", is then optional at the request of the customer, if the raised position of the rear edge of cover 3 is to be higher than during the displacement motion to the rear.

Support lever 43 only passively participates in the opening motion of the cover. The lifting and lowering motion of cover 3 is actively controlled by means of the lifting lever 27. When the cover is moved to the rear, support lever 43 assumes stable support of the rear edge of cover 3 starting at the instant that the two sliding elements 44 and 46 engage guide 42.

In the following, the sequence of motion when opening cover 3, proceeding from its closed position, is described. In the closed position, cover 3 is flush with the surrounding fixed vehicle roof which, in the rear area, is represented by the fixed roof panel 4. Sliding carriage 24 is coupled to second drive lever 38, locking block 34 being disengaged from guide rail 16. Control carriage 10, on the other hand, is locked via locking block 13 to guide rail 16. At the start of the lifting motion, second drive cable 38 moves forward in the direction of travel and first drive cable 37 moves oppositely, in the direction of travel to the rear. In doing so, first drive cable 37 first traverses an idle path.

With cover 3 completely closed, guiding pin 29 on lifting lever 27 is located in segment 33E of lifting cam member 33, lifting lever 27 assumes a position which lies flat to the front. Guide pin 20 of lifting lever 18 is located in front segment 22A of guide path of lifting cam member 21, lifting lever 27, likewise, assuming a position which lies flat to the front. When sliding carriage 24 moves forward, guiding pin 29 of lifting lever 27 traverses segment 33D of lifting cam member 33, and segment being sloped upward obliquely forward, lifting lever 27 assuming an increasingly raised position. At the same time, guide pin 20 passes through segment 22B of guide path 22, the front leg of lifting lever 18 rising slowly and cover bearing 7 being raised at the same time via slot 18A on its front edge and via lifting pin 17. Cover 3 is overall raised more to the rear than to the front and with its rear edge and front edge is released from the seal. By raising the front edge of the cover, cover 3 is also moved into a less dramatically inclined position compared to roof panel 4, so that when cover 3 moves, an almost parallel position relative to the roof panel 4 can be reached with a very short distance between these two components as represented in FIG. 4B. In the raising motion of cover 3, lifting pin 30 slides in guide path 32 of cover guide 31 to the front. By guiding front cover bearing 7 with pin 8 in crank 9 of control carriage 10, the guide path inclined obliquely upwards to the rear, slight motion to the rear is imparted to cover 3 at the same time when lifting and prevents sticking of the seal in the area of the front edge of the cover.

In its completely raised position, cover 3 as shown in FIGS. 3A and 3B is labeled 3'. At the same time, this position corresponds to the height at which cover 3 can be displaced to the rear a short distance over the fixed roof panel 4. By the corresponding configuration of the guide paths 22 and 33, however, the raised position of the cover can also be reached; it is labeled 3" in FIGS. 3A and 3B. In this cover position, on the rear edge, an enlarged vent gap is cleared as an intermediate position. Before movement to the rear, in this case, cover 3 would be lowered again into the position labeled 3' by a correspondingly inclined guide segment of guide paths 22 and 33 so that cover 3 and the roof panel 4 have a very small distance when cover 3 is moved to the rear. In this way, wind noise and vibrations, especially at higher speeds, are greatly reduced.

As shown in FIGS. 3A and 3B, in the cover position labeled 3', guiding pin 29 of lifting lever 27 is in horizontal middle segment 33C of lifting cam member 33 and guide pin 20 is in a roughly horizontal middle segment 22E of guide path 22. Lifting pin 30 is still engaged with guide path 32 of cover crank 31. Guide pin 14 of front cover bearing 7 has not yet entered guide path 15 and front sliding element 46, in the position labeled 46', has not yet entered feed bevels 42A of guide 42. In this transfer position from the raising mechanism to the support mechanism, the idle path of first drive cable 37 is ended and a carrier provided on this drive cable 37 displaces locking block 13 out of its locked position with guide rail 16 and into the position coupling drive cable 37 with control carriage 10. As the drive cable continues to move, cover 3 is now moved to the rear by coupling of pin 8 to crank 9 of control carriage 10. In doing so, guiding pin 14 enters guide path 15 and front sliding element 46 on support lever 43 enters guide 42. As the cover continues to be displaced to the rear, lifting pin 17 on front cover bearing 7 emerges from the rearwardly open slot 18A of lifting lever 18, and at the same time or shortly thereafter, lifting pin 30 on lifting lever 27 emerges from forwardly opend guide path 32 of cover guide 31. By the continuing coupling of sliding carriage 24 to second drive cable 38, lifting lever 27 is moved into the lowered position by path segment 33B being inclined obliquely to the front in interaction with guiding pin 29. By coupling of lifting cam member 21 via connection 23 to sliding carriage 24, at the same time, lifting lever 18 is switched into a position lowered to the front when guide pin 20 passes through path segment 22F of guide path 22, said path being upwardly inclined obliquely to the rear.

As soon as guide pin 20 has reached short horizontal end segment 22G of crank path 22 and guiding pin 29 has reached front horizontal end segment 33A of lifting cam member 33, coupling between sliding carriage 24 and second drive cable 38 is canceled, locking block 34, at the same time, being switched into the locking position of sliding carriage 24 with guide rail 16 into the receiver present there. As cover 3 continues to move to the rear, second drive cable 38, which is not decoupled, traverses an idle path to the front.

With cover 3 fully opened, as shown in FIGS. 4A and 4B, guiding pin 14 is inserted into crank path 36 of stationary crank 35, said path having a slightly rising path segment and a horizontal end segment located on the end of guide path 15. Front cover bearing 7, here, lies directly in front of the fixed roof panel 4. By means of the described mechanism, thus, a very large opening width of externally guided cover 3 can be achieved. Lifting lever 18 and lifting lever 27 are lowered to the front and in doing so are likewise under the level of the surrounding fixed roof skin so that there is no disruptive optical effect caused by the lifting mechanism. Guidance in the area of the rear edge of the cover takes place during the displacement motion exclusively by support levers 43 which are guided using two sliding elements 44 and 46 securely in cover-mounted guide 42 which is likewise located underneath the level of the fixed vehicle roof 1. Thus, only relatively slender support levers 43 project above fixed vehicle roof 1 in the completely opened position, and during movement, displace sealing lip 49A of sealing element 49 in sections.

The closing motion takes place exactly in the reverse sequence as described above.

Figure 9:
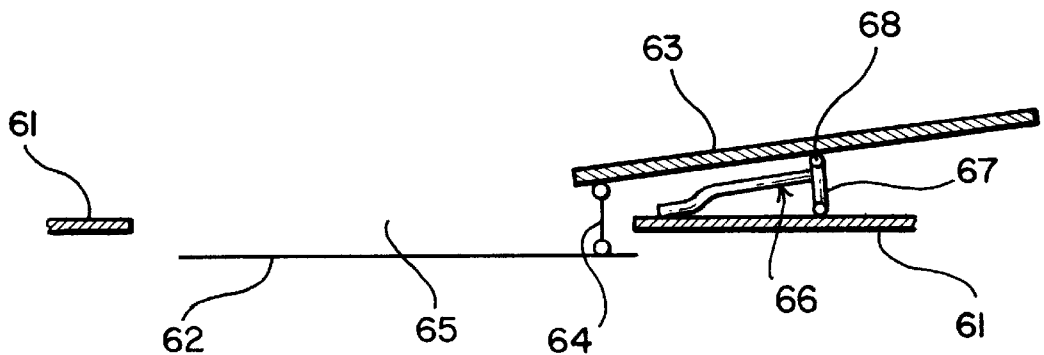
FIG. 9 shows the version as shown in FIG. 7 in the opened form.
Figure 10:
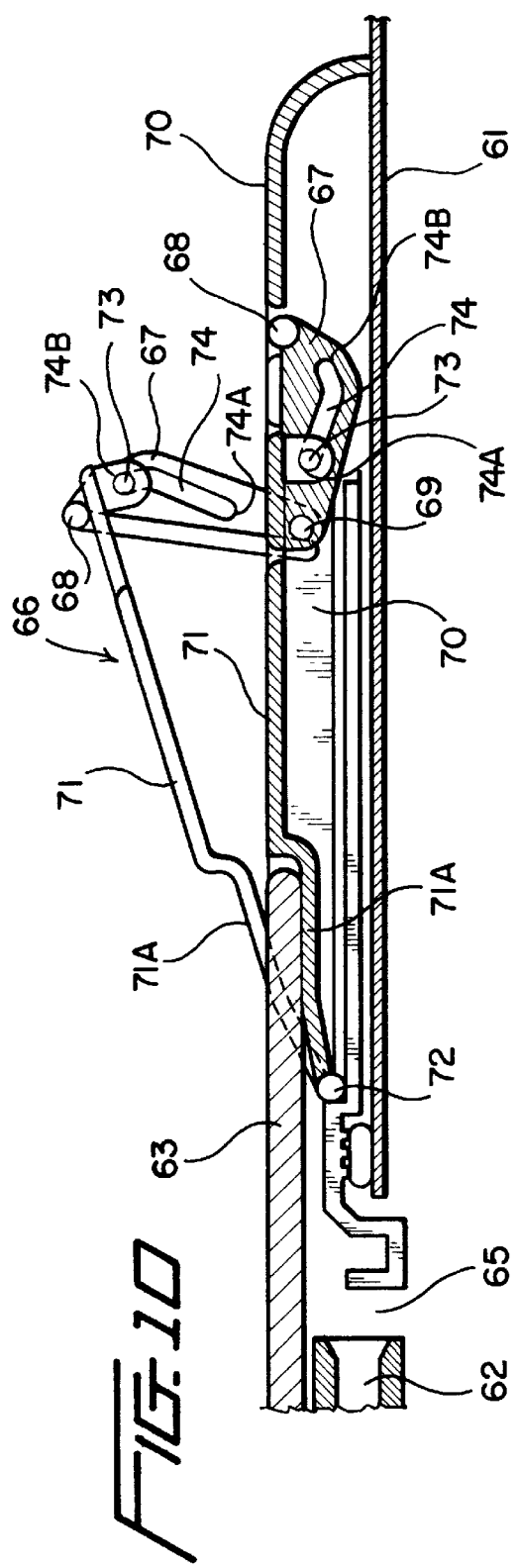
FIG. 10 shows a partial longitudinal section through the version as shown in FIG. 7 in the area of rear edge of the cover.

In the second embodiment shown in FIGS. 7 through 14, in fixed vehicle roof 61, there is a movable cover 63 for selective covering of roof opening 65. Cover 63 can be raised with a lifting mechanism 64 consisting of a front swivel bearing 64A and a rear lifting lever 64B with its rear edge above the fixed vehicle roof (FIG. 8) and can then be moved to the rear (FIG. 9). During movement to the rear, driving taking place via a drive cable (not shown) which can be coupled to front part 64A of the lifting mechanism, the cover is supported on its underside in the area of its rear edge by additional support mechanism 66. Support mechanism 66 is composed of a support lever 67 and a swivel lever 71. Swivel lever 71, in the area of the rear edge of cover 63, is pivotally supported underneath the latter on the fixed vehicle roof 61 by means of swivel bearing 72. With a right angle bend, it fits behind the rear edge of cover 63 in its closed position (FIG. 10). On its back end, swivel lever 71, via pin 73, engages slot 74 which is formed in support lever 67. Support lever 67, on its back end, has a sliding element 68 which, in the raised state shown in FIG. 10 in the unshaded position, forms the uppermost part of support mechanism 66. This sliding element 68 is used as an additional rear support for cover 63 when the latter moves to the rear as shown in FIG. 9. In this position shown in FIG. 9, the two elements of lifting mechanism 64 underneath the front edge of the cover are moved together nearby, so that cover 63 can likewise almost completely clear roof opening 65, good support of the rear edge of cover 63 resulting by means of additional support via sliding element 68 of support mechanism 66. Cover 63 in the simplest case can be supported by cover 63 resting on sliding element 68; in an improved embodiment (not shown) sliding element 68, when cover 63 moves, engages the rail-shaped guide on the bottom of the cover, so that lifting of the rear edge of the cover as a result of vibrations or shaking is prevented.

Figure 12:
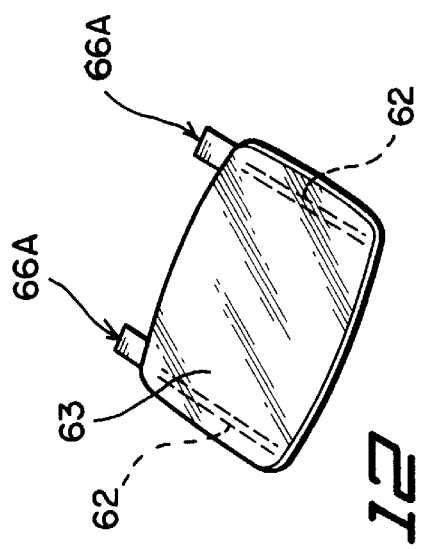
FIG. 12 shows a schematic of two side support devices.
Figure 11:
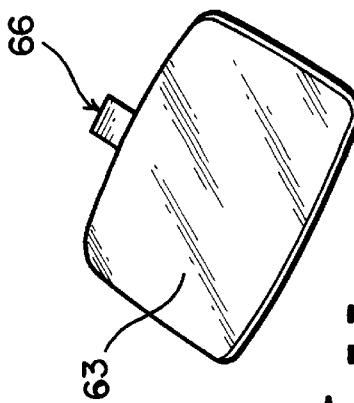
FIG. 11 shows a schematic of a central support device.

Support mechanism 66, as shown schematically in FIG. 11, can be provided easily in a center arrangement behind the rear edge of cover 63. But is can also be advantageously provided in an alternative embodiment as shown in FIG. 12 to both sides in the area of the rear edge of cover 63, in this embodiment reference numbers 66A having been used.

Figure 13:
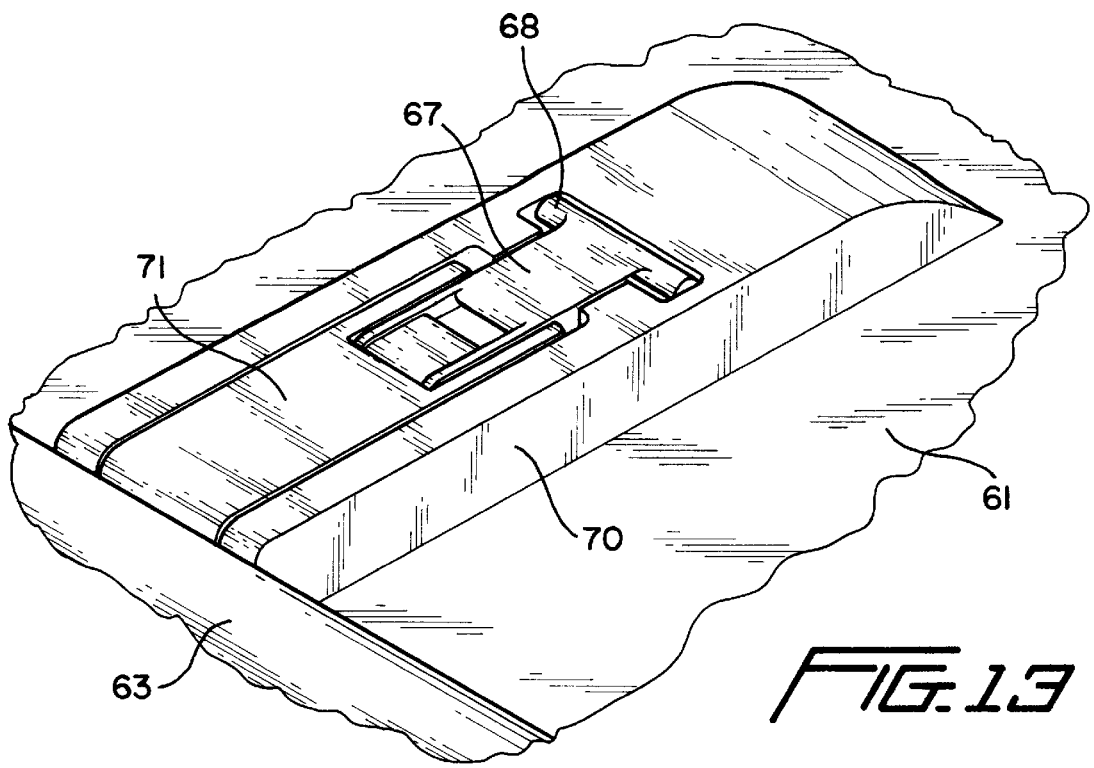
FIG. 13 shows a partial perspective view of a support device as shown in FIGS. 7 through 12 from overhead, in the folded-up state.
Figure 14:
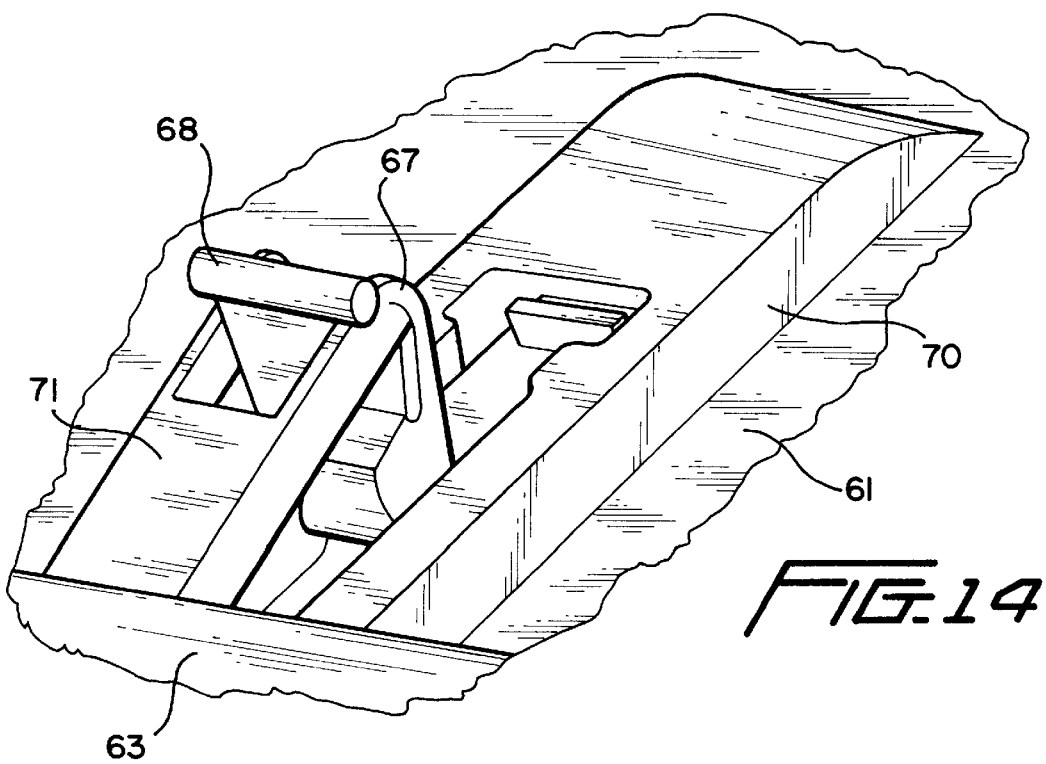
FIG. 14 shows a perspective partial view as in FIG. 13 with the support device raised.

Support mechanism or additional support mechanisms 66 and 66A can be either recessed in the rear area of fixed vehicle roof 61 as represented in FIG. 10 or, as is shown in FIGS. 13 and 14, an additional roof part 70, for example, of plastic, can be seated on the fixed roof skin 61 and used to accommodate support mechanism 67 or 71. Because of the right angle bend of swivel lever 71 at 71a, the lever fits underneath the rear edge of cover 63 and the results overall a smooth appearance of cover 63 with support mechanism 66 behind it (FIG. 10). The embodiment shown in FIGS. 7 through 14 is also well suited for subsequent installation in a vehicle roof.

FIGS. 15 through 19 show a third embodiment of the invention. All parts with a function similar to the first embodiment as shown in FIGS. 1 through 6 are provided with a reference number raised by 100. In this embodiment, the lifting mechanism in the area of the rear edge of the cover and the lifting and displacement mechanism in the area of the front edge of the cover are moved by means of single drive cable 137 which moves exclusively from front to rear when cover 103 is opened.

In particular, the front lifting and displacement mechanism has the following components:

A cover bearing 107 is connected to a cover carrier 104 which is attached to the bottom of cover 103, at both sides, two pins attached on different sides to this cover bearing 107, of which a front pin 108 engages a guide 109 located stationary on guide rail 116 and a rear guiding pin 114 engages a guide path 122 which is located on front carriage 110 and which is likewise connected to the single drive cable 137, like sliding carriage 124 for support of lifting lever 127. Front carriage 110 and sliding carriage 124 can be moved by means of drive cable 137 by a crank or electric drive along two guide rails 116 which are located on each side of the roof opening underneath cover 103.

The rear lifting mechanism has a lifting lever 127 which is supported by a swivel pin 128 at its front end so as to swivel on sliding carriage 124. Lifting lever 127, roughly in the middle, has a guiding pin 129 which engages a guide path for stationary lifting cam member 133. With its back end, lifting lever 127, via lifting pin 130, engages the guide path 132 which is provided on lifting cam member 131 of cover 103. Guide path 132 is open to the rear, and after raising cover 103 and after transfer of the support function from lifting lever 127 to support lever 143 located separately to the outside and laterally therefrom, enables emergence of lifting pin 130 underneath.

The guide path of the lifting cam member 133 is composed of path segments 133A to 133E, analogous to the first embodiment.

In the closed position as shown in FIG. 15, guiding pin 129 is located in roughly horizontal path segment 133A of lifting cam member 133, said segment being farthest forward. When sliding carriage moves to the rear, guiding pin 129 traverses adjacent path segment 133B, which is inclined obliquely upward to the rear, and causes lifting of the rear edge of the cover. In the completely raised position (FIGS. 16 and 17) and the transfer position (FIG. 18), to support lever 143, guiding pin 129 moves in roughly horizontal path segment 133C which is farthest up. After transfer of the support of the cover 103 to the support lever 143, lifting lever 127 is swivelled down from the guide path 132 mounted on the cover when path segment 133D sloped obliquely downward is traversed, and after traversing lower horizontal path segment 133E passes, lying flat, into a horizontal guide on guide rail 116. In contrast to the first embodiment, lifting lever 127, when cover 103 moves, is therefore continuously dragged to the rear at the same time and is not coupled, for example, to the guide rail by means of a locking block. By eliminating locking blocks 13 and 34, this mechanism is greatly simplified, less sensitive, and can be produced more economically compared to the embodiment shown in FIGS. 1 to 6.

Support lever 132 is made analogously to support lever 43 of the first embodiment. With rear swivel axis 145, the support lever 143 is permanently engaged to guide 142 which runs parallel to guide rail 116 or which is made as an integral part thereof. Support lever 143 is passively raised, at the same time, when lifting lever 127 is swivelled up, front sliding element 146 moving to the same height as swivel axis 145, so that when the support function is transferred from lifting lever 127 to support lever 143, the sliding element 146 can enter guide 142. The transfer position is shown in FIG. 18. In doing so, sliding element 146 can enter guide 142 which is recessed on the bottom. Sliding element 146, resting against the top surface of guide 142, prevents lifting of cover 103. At the same time, lifting pin 130 approaches the recess of crank path 132, said recess being downwardly open. Lifting pin 130, however, still supports the cover to the top. As sliding carriage 124 continues to move to the right, proceeding from FIG. 18, sliding element 146 enters a path segment of guide 142 that is closed to the top and bottom, at the same time, the top end of lifting lever 127 with lifting pin 130 swivels down from the opened part of crank path 132. Cover 103 is now held to the top and bottom solely by support lever 143 which is coupled to cover 103 via coupling pin 147.

The front end of cover 103 is slightly raised at the same time by means of the lifting and displacement mechanism when the rear edge of cover 103 is raised in order to be released from a seal which is not shown. For this reason, carriage 110 coupled to drive cable 137, proceeding from FIG. 15 which shows the closed position, runs jointly with sliding carriage 124 synchronously to the right.

In doing so, the guiding pin 114 traverses path segment 122B of guide path 122, said segment being inclined so as to rise obliquely forward, and in doing so, lifts the cover 103, which is additionally guided by means of pin 108 in stationary guide 109 by the amount shown in FIG. 16. FIGS. 16 and 17 show the completely raised position. As carriage 110 continues to move to the right, pin 114 rises into essentially vertical segment 122A of guide path 122. Starting here, carriage 110 entrains cover 103 for displacement to the rear. At the same time, front pin 108 is transferred from stationary crank 109 to the guide path 115 which is located parallel to guide rail 116 or which is made as an integral part thereof. Closing motion takes place in the reverse sequence.

The above described embodiments are characterized by a support device being present in each case in addition to a lifting device and being located either underneath the cover laterally from it or behind the cover flush with the fixed roof or underneath thereof, with the cover closed. By means of this additional support device which engages in the area of the rear edge of the cover, an especially large opening width of the cover can be achieved, stable support of the rear edge of the cover being achieved even with almost complete opening. Still, in contrast to vehicle roofs with a guide located above the fixed vehicle roof, a smooth appearance is achieved with the cover closed.

In one especially simple embodiment which is formed by modification of the first embodiment as shown in FIGS. 1 to 6 or the third embodiment as shown in FIGS. 15 through 19, the function of lifting lever 27 is integrated with the function of the support lever 43 into one unit. In doing so, lifting lever 27 or 127 can be located in the outlying part, i.e., in the area of guide 42 or 142. Also, this idea, which is not illustrated, is completely new compared to the prior art. An element which functions as a lifting and support lever, which engages the back end of a cover which can be raised and which moves to the rear above the fixed vehicle roof, which can emerge to the top when rising out of a groove which runs lengthwise and which is covered by a flexible covering element between the side member and rear roof plate, cannot be taken from the prior art and is intended to be likewise encompassed by the scope of the appended claims.

What is claimed is:

1. Openable vehicle roof comprising:
   a cover having a closed position for covering an opening in a fixed roof and having a ventilation position in which a rear edge of the cover is lifted upward and at least one open position in which the cover is raised from the closed position and moved back out of the roof opening over the fixed roof;
   a device for lifting the cover;
   a device for moving the cover along at least one guide mounted to the fixed roof; and
   a support device which engages an area of the rear edge of the cover which is rearward of the roof opening when the cover is in said at least one open position, the support device having a first position in which the support device actively supports the cover and in which the support device projects upwardly above the fixed roof in at least said open position of the cover and second position in which the support device is inactive and is retracted into the fixed roof or a part attached thereto in the closed position of the cover.

2. Vehicle roof as claimed in claim 1, wherein the support device engages the cover only when the cover is moved out of said closed position.

3. Vehicle roof as claimed in claim 1, wherein the support device is located at least partially underneath the cover in the closed position.

4. Vehicle roof as claimed in claim 1, wherein the support device comprises a support lever which is coupled at one end to a rear area of the cover and at another end is supported by at least one sliding element in a sliding guide on the fixed roof.

5. Vehicle roof as claimed in claim 4, wherein said at least one sliding element comprises a first sliding element which is permanently engaged with said sliding guide; wherein said sliding element is mounted on the cover and defines a swivel axis for the support lever during lifting motion of the cover; and wherein the support lever has a second sliding element which engages the sliding guide only during rearward displacement motion of the cover.

6. Vehicle roof as claimed in claim 5, wherein the sliding guide for the support lever is located in a side edge area of the cover in a recessed part of the fixed vehicle roof.

7. Vehicle roof as claimed in claim 4, wherein the sliding guide on the roof is covered by a flexible sealing element which is at least partially displaced upward by the support lever as it moves from said second position to said first position when cover is raised.

8. Vehicle roof as claimed in claim 1, wherein the device for lifting the cover is connected to an actuating mechanism which lies inward of said support lever.

9. Vehicle roof as claimed in claim 4, wherein an area of the fixed roof in which the sliding guide is located forms a gutter which runs lengthwise and which is sealed relative to an area in which the lifting lever is located via a sealing surface.

10. Vehicle roof as claimed in claim 1, wherein the support device is joined to the device for lifting.

11. Vehicle roof as claimed in claim 1, wherein the support device is located rearward of the cover in the closed position.

12. Vehicle roof as claimed in claim 1, wherein said support device comprises a respective support device provided on each side of cover.

13. Vehicle roof as claimed in claim 1, wherein the support device is located in a transversely central area of the cover.

14. Vehicle roof as claimed in claim 1, wherein the device for lifting and the device for displacement of the cover are actuated by different drive elements.

15. Vehicle roof as claimed in claim 1, wherein the device for lifting and the device for displacement of the cover are actuated by the same drive element.

* * * * *